(12) United States Patent
Nuss et al.

(10) Patent No.: US 11,821,675 B2
(45) Date of Patent: Nov. 21, 2023

(54) MOUNTING SYSTEM FOR REFRIGERATOR APPLIANCE (71) Applicant: Haier US Appliance Solutions, Inc., Wilmington, DE (US)

(72) Inventors: Bart Andrew Nuss, Fisherville, KY (US); Stephanos Kyriacou, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 423 days.

(21) Appl. No.: 17/071,349

(22) Filed: Oct. 15, 2020

(65) Prior Publication Data

US 2022/0120489 A1  Apr. 21, 2022

(51) Int. Cl.
| | |
|---|---|
| *F25D 19/00* | (2006.01) |
| *B60P 7/08* | (2006.01) |
| *F25D 23/10* | (2006.01) |
| *F25D 23/00* | (2006.01) |
| *B60P 7/16* | (2006.01) |

(52) U.S. Cl.
CPC ............ *F25D 19/00* (2013.01); *B60P 7/0823* (2013.01); *B60P 7/16* (2013.01); *F25D 23/00* (2013.01); *F25D 23/10* (2013.01); *F25D 2400/32* (2013.01)

(58) Field of Classification Search
CPC .......... F25D 19/00; F25D 23/00; F25D 23/10; F25D 2400/32; B60P 7/0823; B60P 7/16; Y10T 24/318
See application file for complete search history.

(56) References Cited

U.S. PATENT DOCUMENTS

| | | | | |
|---|---|---|---|---|
| 5,076,525 | A * | 12/1991 | Whipple | F24C 15/083 248/500 |
| 5,174,543 | A * | 12/1992 | Corson | A47B 97/00 248/500 |
| 5,624,098 | A * | 4/1997 | McDowell | F24C 15/083 248/500 |
| 10,259,373 | B1 | 4/2019 | Stegall | |
| 10,345,027 | B1 | 7/2019 | Fazi | |
| 2004/0227860 | A1* | 11/2004 | DePaolo | H04N 5/64 348/836 |

(Continued)

FOREIGN PATENT DOCUMENTS

| | | | | |
|---|---|---|---|---|
| CN | 203255016 U | 10/2013 | | |
| EP | 1396693 A1 * | 3/2004 | ............. | A47B 97/00 |

(Continued)

*Primary Examiner* — Tan Le
(74) *Attorney, Agent, or Firm* — Dority & Manning, P.A.

(57) ABSTRACT

A mounting system for securing an appliance to a wall includes at least one wall bracket for mounting to the wall and at least one appliance bracket for mounting to the appliance. The wall bracket(s) includes at least one wall attachment location and the appliance bracket(s) includes at least one appliance attachment location. The mounting system also includes at least one strap lock for mounting to a floor adjacent to the wall. The strap lock(s) is operable between a locked position and an unlocked position. Further, the mounting system includes at least one strap routed through the wall attachment location(s), the appliance attachment location(s), and the strap lock(s). Thus, when in the locked position, the strap lock secures the strap in place, thereby securing the appliance to the wall.

18 Claims, 8 Drawing Sheets

(56) References Cited

U.S. PATENT DOCUMENTS

2004/0263035 A1    12/2004   Lee
2007/0164190 A1*   7/2007   Lowenstein, Jr. ..... A47B 97/00
                                                             248/680

FOREIGN PATENT DOCUMENTS

JP         H08334286 A   *   12/1996
JP          H1030875 A   *   2/1998

\* cited by examiner

MOUNTING SYSTEM FOR REFRIGERATOR APPLIANCE

FIELD OF THE INVENTION

The present subject matter relates generally to refrigerator appliances, and more particularly to mounting systems for refrigerator appliances.

BACKGROUND OF THE INVENTION

Generally, refrigerator appliances include a cabinet that defines a fresh food chamber for receipt of food items for storage. Many refrigerator appliances further include a freezer chamber for receipt of food items for freezing and storage. Certain refrigerator appliances also include an ice maker. In certain instances, it may be beneficial to include a refrigerator appliance in a ground transportation vehicle, watercraft, or aircraft. In particular, recreational vehicles are often equipped with a refrigerator appliance for storing food or drink items while traveling. Other appliances may also be included in such vehicles, including, as an example, ovens, dishwashers, microwaves, etc. During travel, however, such appliances are subject to shock and vibration and may also bounce or slide out of position. In extreme instances, the appliance(s) may fall over and become damaged.

As such, there is a need for a mounting system for securing an appliance, such as a refrigerator appliance, in place in such vehicles to mitigate shock and vibration and retain the appliance in its intended position in the vehicle.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a mounting system for securing an appliance, such as a refrigerator appliance, to a wall. The mounting system includes at least one wall bracket for mounting to the wall and at least one appliance bracket for mounting to the appliance. The wall bracket(s) includes at least one wall attachment location and the appliance bracket(s) includes at least one appliance attachment location. The mounting system also includes at least one strap lock for mounting to a floor adjacent to the wall. The strap lock(s) is operable between a locked position and an unlocked position. Further, the mounting system includes at least one strap routed through the wall attachment location(s), the appliance attachment location(s), and the strap lock(s). Thus, when in the locked position, the strap lock secures the strap in place, thereby securing the appliance to the wall.

In another aspect, the present disclosure is directed to a method for securing an appliance, such as a refrigerator appliance, to a wall. The method includes mounting at least one wall bracket to the wall, the at least one wall bracket comprising at least one wall attachment location. Further, the method includes mounting at least one appliance bracket to the appliance, the at least one appliance bracket comprising at least one appliance attachment location. The method also includes mounting at least one strap lock to a floor adjacent to the wall, the at least one strap lock operable between a locked position and an unlocked position. Moreover, the method includes positioning a rear side of the appliance adjacent to the wall comprising the at least one wall bracket. In addition, the method includes routing at least one strap through the at least one wall attachment location, the at least one appliance attachment location, and the at least one strap lock and pulling the at least one strap to move the appliance in a desired position. Once positioned, the method includes placing the at least one strap lock in the locked position to secure the at least one strap in place, thereby securing the appliance to the wall in the desired position.

In yet another aspect, the present disclosure is directed to a mounting system for securing an appliance, such as a refrigerator appliance, to a wall. The mounting system includes at least one wall bracket for mounting to the wall and at least one appliance bracket for mounting to the appliance. The wall bracket(s) includes at least one wall attachment location and the appliance bracket(s) includes at least one appliance attachment location. The mounting system further includes a male component extending from one of the at least one wall bracket or the at least one appliance bracket, the male component being moveable in a vertical direction and a female component extending from the other of the at least one wall bracket or the at least one appliance bracket. Thus, when the appliance is positioned adjacent to the wall comprising the at least one wall bracket, the male component engages the female component to lock the appliance in place.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
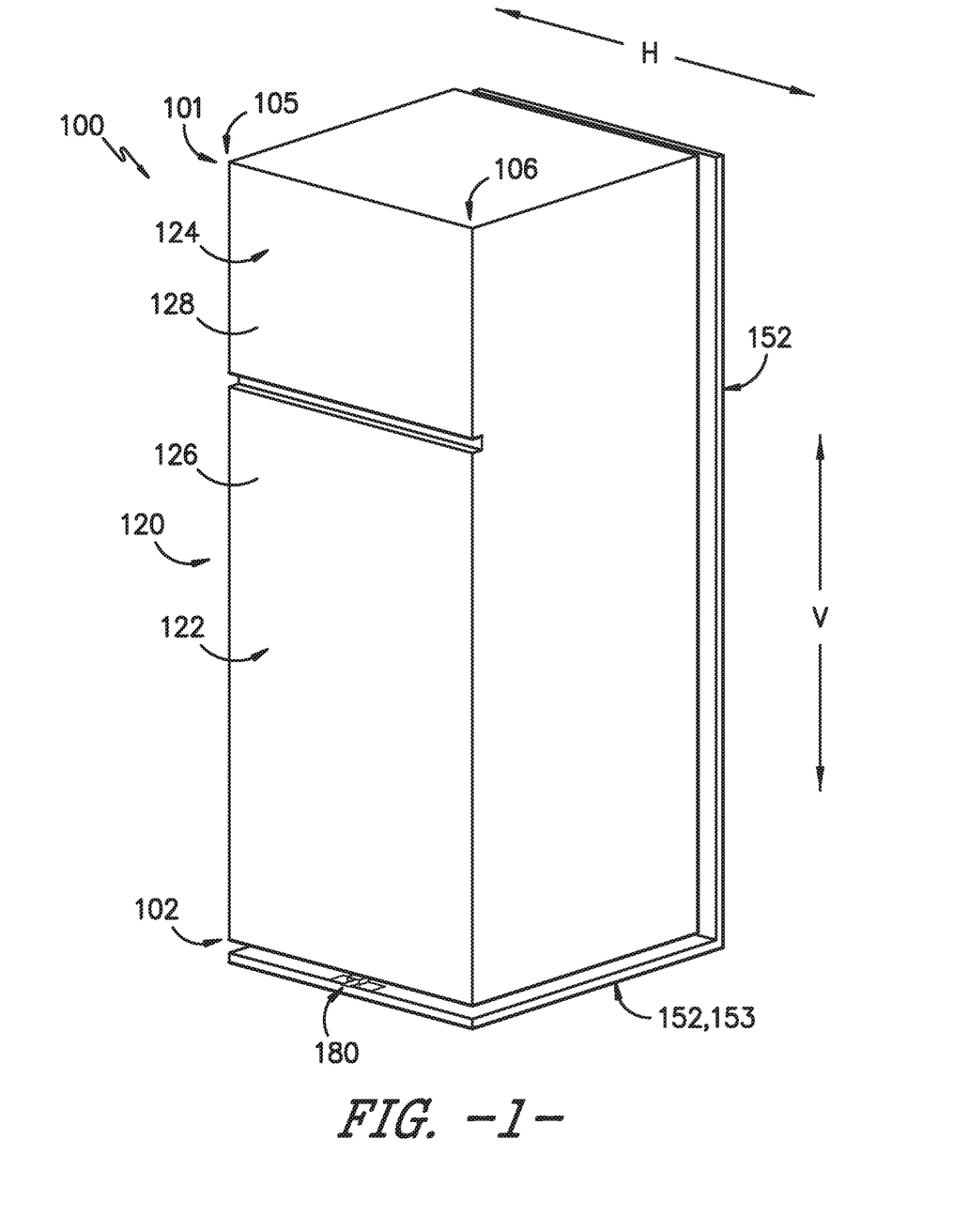
FIG. 1 illustrates a front elevation view of a refrigerator appliance according to an exemplary embodiment of the present subject matter.

Referring now to the drawings, FIG. 1 illustrates a front view of an exemplary embodiment of a refrigerator appliance 100. As shown, the refrigerator appliance 100 extends between a top portion 101 and a bottom portion 102 along a vertical direction V. Further, as shown, the refrigerator appliance 100 also extends between a first side portion 105 and a second side portion 106 along a horizontal direction H. Further, as shown, the refrigerator appliance 100 includes a cabinet or housing 120 defining a fresh food chamber 122 and a freezer chamber 124 arranged above the fresh food chamber 122 on the vertical direction V. Using the teachings disclosed herein, one of skill in the art will understand that the present invention can be used with other types of refrigerators (e.g., side-by-sides) or any other types of appliance as well. Consequently, the description set forth herein is for illustrative purposes only and is not intended to limit the invention in any aspect.

Still referring to FIG. 1, each of the fresh food chamber 122 and the freezer chamber 124 is sealed closed via a refrigerator door 126, 128. Further, each of the refrigerator doors 126, 128 are rotatably hinged to an edge of the housing 120 for accessing the fresh food chamber 122 and the freezer chamber 124, respectively. It should be noted that any suitable arrangement of doors utilizing one, two or more doors is within the scope and spirit of the present disclosure.

Figure 2:
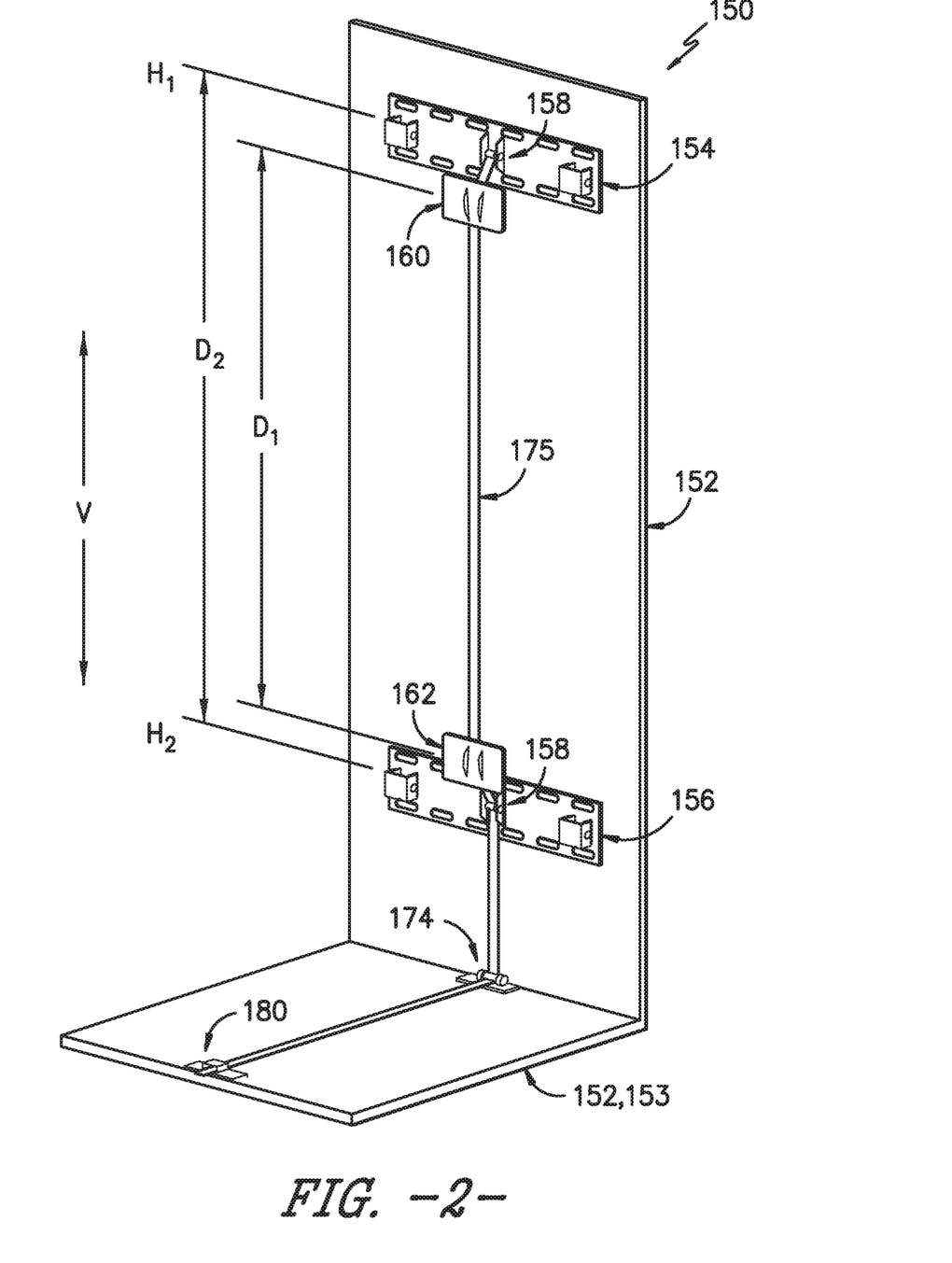
FIG. 2 illustrates a perspective view of one embodiment of a mounting system for a refrigerator appliance according to an exemplary embodiment of the present subject matter.

Referring now to FIGS. 1-8B, the refrigerator appliance 100 is secured in place via a mounting system 150. In particular, as shown in FIGS. 1 and 2, the mounting system 150 secures the refrigerator appliance 100 to one or more walls 152 (e.g. a wall 152 and/or a floor 153). It should be understood that the wall 152 and/or floor 153 may part of a ground transportation vehicle, watercraft, or aircraft. In particular embodiments, for example, the wall 152 may be part of a recreational vehicle. Though the refrigerator appliance 100 of the present disclosure is described herein as being mounted to a recreational vehicle, in further embodiments, the wall 152 may be part of a boat, plane, or within any other suitable location that may benefit from securing the refrigerator appliance 100 (or any other appliance) in place while moving.

Figure 3:
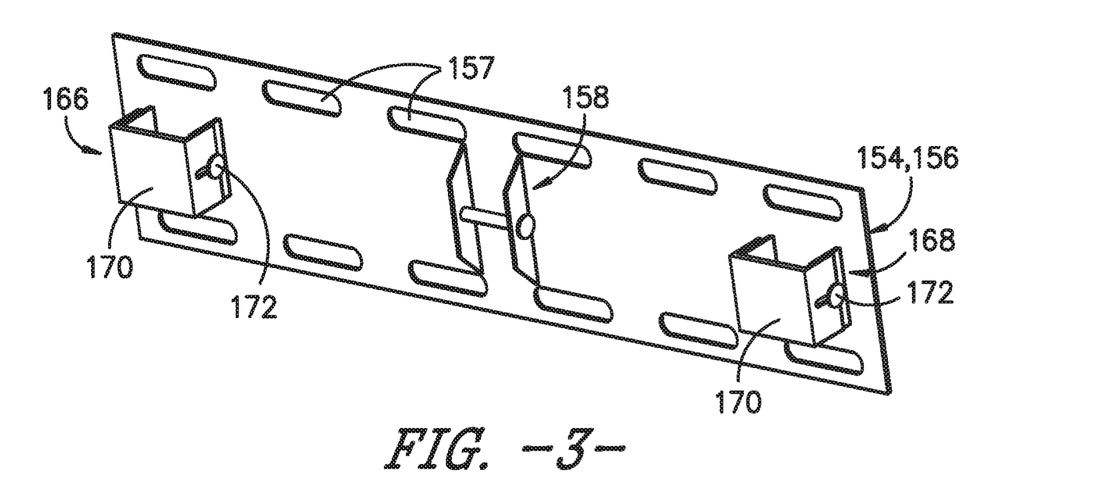
FIG. 3 illustrates a perspective view of one embodiment of a wall bracket of a mounting system for a refrigerator appliance according to an exemplary embodiment of the present subject matter.
Figure 4:
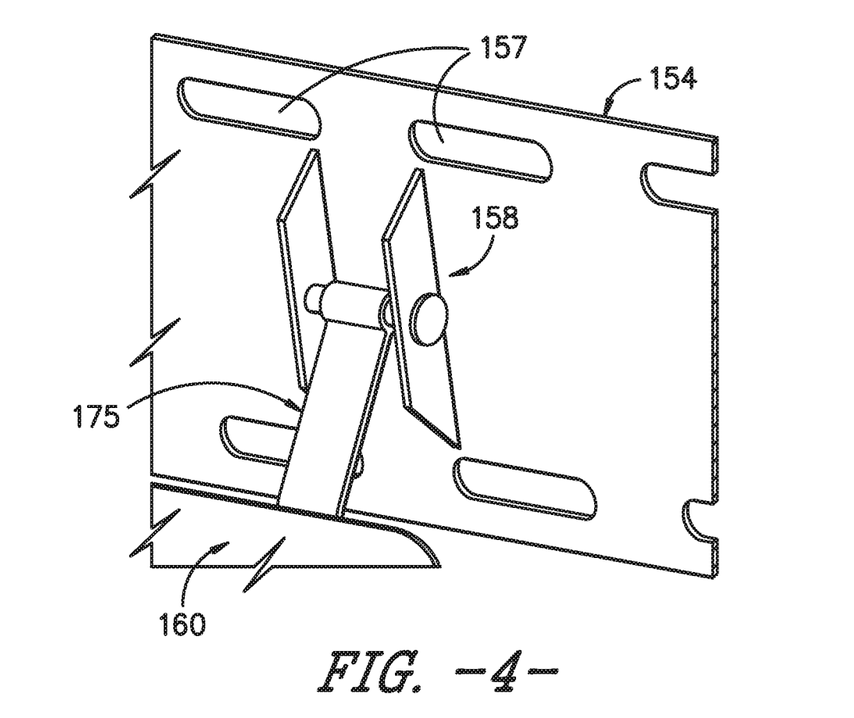
FIG. 4 illustrates a partial perspective view of one embodiment of a wall bracket of a mounting system for a refrigerator appliance according to an exemplary embodiment of the present subject matter.

Referring particularly to FIG. 2, the mounting system 150 includes at least one wall bracket 154, 156 for mounting to the wall 152. For example, as shown, the mounting system 150 includes a first wall bracket 154 and a second wall bracket 156. In addition, as shown, the first wall bracket 154 is mounted at a first height $H_1$, whereas the second wall bracket 156 is mounted at a second height $H_2$. Moreover, as shown, the first height $H_1$ is higher than the second height $H_2$. Further, the wall brackets 154, 156 may be mounted to the wall 152 using any suitable attachment methods, such as via adhesives, fasteners, etc. In particular, as shown in FIGS. 3 and 4, the wall brackets 154, 156 may have one or more slots 157 or openings configured to receive various fasteners therethrough for securing the wall brackets 154, 156 to the wall 152. It should be further understood that any number of wall brackets may be mounted to the wall 152 at any suitable height, including multiple wall brackets at the same height or different heights. Furthermore, each of the wall bracket(s) 154, 156 includes at least one wall attachment location 158, which is explained in more detail herein below.

Referring now to FIG. 3, one or more of the wall brackets 154, 156 may also include at least one spacer 166, 168 for providing a predetermined gap between the refrigerator appliance 100 and the wall 152. For example, as shown, the wall bracket 154, 156 includes first and second spacers 166, 168, i.e. one on each side of the attachment location 158. In such embodiments, the spacer(s) 166, 168 may also include an optional elastomeric pad 170, e.g. for reducing slippage, shock, or vibration. Moreover, in certain embodiments, the spacer(s) 166, 168 may include at least one fastener 172, e.g. for adjusting a distance between a face of the elastomeric pad 170 and the wall 152.

Figure 5:
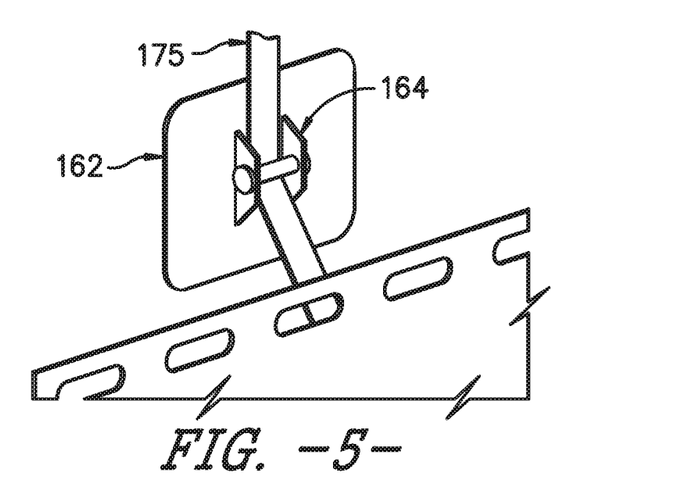
FIG. 5 illustrates a perspective view of one embodiment of an appliance bracket of a mounting system for a refrigerator appliance according to an exemplary embodiment of the present subject matter.

In addition, as shown, the mounting system 150 also includes at least one appliance bracket 160, 162 for mounting to the refrigerator appliance 100. For example, as shown in FIGS. 2, 4, and 5, the mounting system 150 includes a first appliance bracket 160 and a second appliance bracket 162 that are generally aligned with the first and second wall brackets 154, 156. In addition, as shown in FIG. 2, a distance $D_1$ between the first and second appliance brackets 160, 162 is less than a distance $D_2$ between the first and second wall brackets 154, 156. Moreover, as shown particularly in FIG. 5, each of the appliance brackets 160, 162 includes at least one appliance attachment location 164. Further, the appliance brackets 160, 162 may be mounted to the refrigerator appliance 100 using any suitable attachment methods, such as via adhesives, fasteners, etc.

Figure 6:
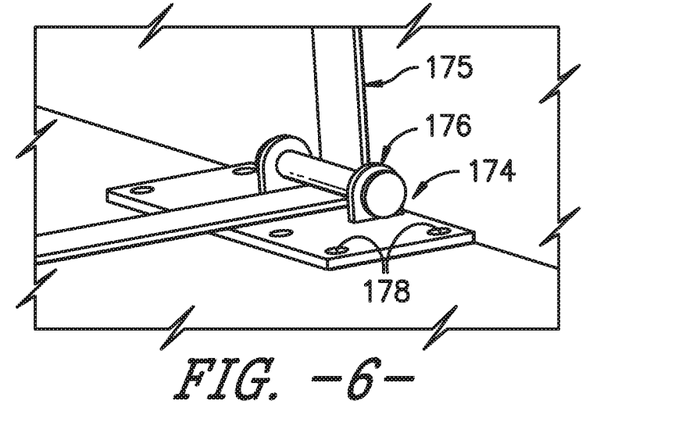
FIG. 6 illustrates a perspective view of one embodiment of a floor bracket of a mounting system for a refrigerator appliance according to an exemplary embodiment of the present subject matter.
Figure 7:
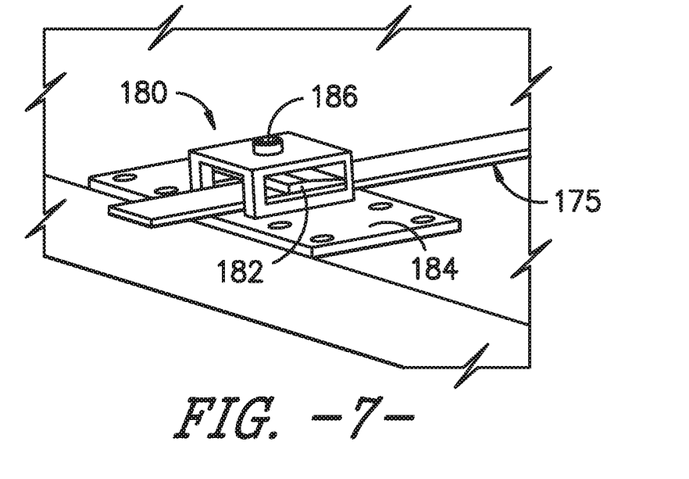
FIG. 7 illustrates a perspective view of one embodiment of a strap lock of a mounting system for a refrigerator appliance according to an exemplary embodiment of the present subject matter.

As shown in FIGS. 1, 2, and 7, the mounting system 150 may further include at least one floor bracket 174 for mounting to the floor 153 and/or the wall 152 of the recreational vehicle. For example, as shown particularly in FIG. 6, similar to the other brackets described herein, the floor bracket 174 also includes at least one floor attachment location 176. In addition, as shown, the floor bracket 174 has a generally flat configuration with a plurality of through holes 178 designed to receive fasteners for securing the floor bracket 174 to the floor 153 and/or the wall 152. In further embodiments, the floor bracket 174 may have other configurations, such as an L-shaped configuration.

Accordingly, the mounting system 150 also includes at least one strap 175 routed through the wall attachment location(s) 158, the appliance attachment location(s) 164, the floor attachment location 176 and/or a strap lock(s) 180. For example, as shown generally in FIGS. 1 and 4-7, the strap 175 can be generally secured to various attachment locations of the brackets using a pin or raised pass-through feature. In particular, as shown in FIG. 4, the strap 175 can be secured around a pin of the first wall bracket 154. As shown in FIG. 5, the strap 175 can then be routed through a pass-through feature of the first appliance bracket 160. Then, as shown in FIG. 2, the strap can be routed through a pass-through feature of the second first appliance bracket 162 and the attachment location 158 of the second wall bracket 156. Thus, as shown in FIG. 6, the strap 175 can also be secured through the attachment location 176 of the floor bracket 174 and then locked via the strap lock 180. The strap 175 may also be pulled to further position the refrigerator appliance in place (e.g. against the spacers 166, 168) and then, while the strap 175 is tensioned, the strap lock 180 can be placed in the locked position.

Figure 8A:
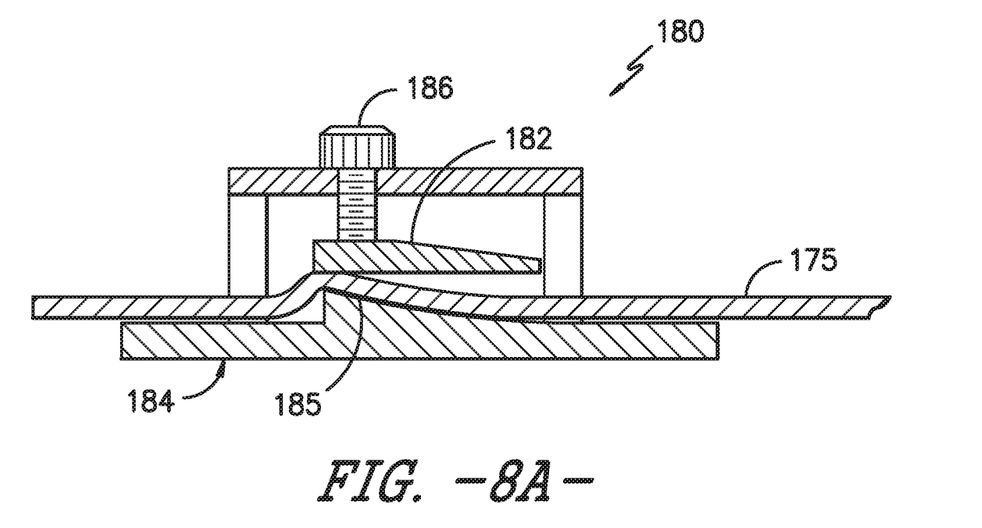
FIG. 8A illustrates a cross-sectional view of the strap lock of FIG. 7 in a locked position.
Figure 8B:
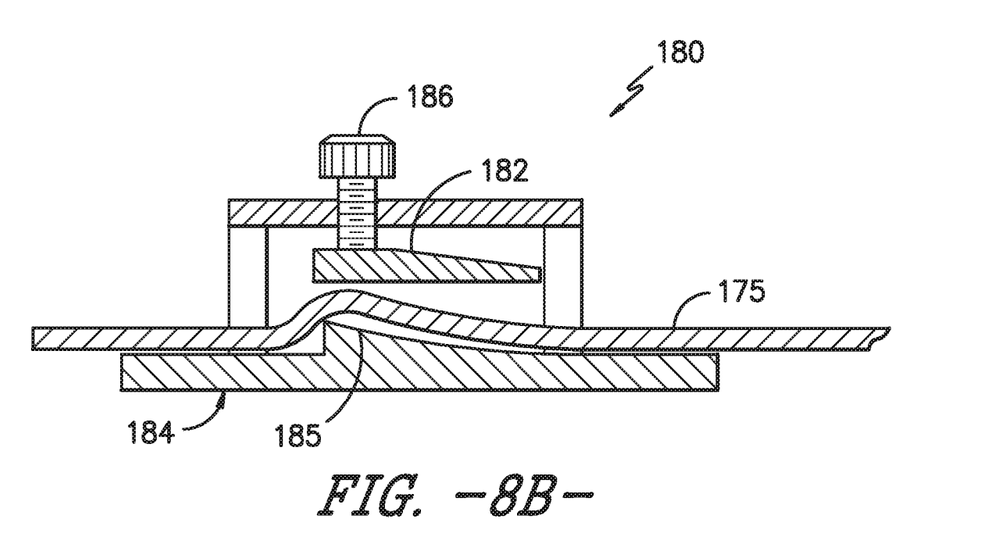
FIG. 8B illustrates a cross-sectional view of the strap lock of FIG. 7 in an unlocked position.

For example, as shown FIGS. 1, 2, 7, 8A, and 8B, the strap lock 180 may be mounted to the floor 153 adjacent to the wall 152. More particularly, as shown in FIGS. 7 and 8A and 8B, in certain embodiments, the strap lock 180 may include a floating wedge 182 mounted to a bracket 184 and at least one fastener 186. As such, the fastener(s) 186 is configured to bias the floating wedge 182 against an inclined plane 185 on a body of the bracket 184 and the strap 175 (which is routed below the floating wedge 182) such that, when the fastener(s) 186 is advanced to move the wedge 182 against the inclined plane 185, the wedge 182 is forced downward onto the strap 175 and into the locked position (FIG. 8A).

In certain embodiments, as shown in FIG. 1, when the refrigerator appliance 100 is secured to the wall 152 via the mounting system 150, only the strap lock 180 is visible, with the wall brackets 154, 156, the appliance bracket 160, 162, and the floor bracket 174 being concealed by the refrigerator appliance 100. In such embodiments, the strap lock(s) 180 is operable between a locked position (FIG. 8A) and an unlocked position (FIG. 8B). Thus, when in the locked position (FIGS. 1 and 8A), the strap lock 180 secures the strap 175 in place, thereby securing the refrigerator appliance 100 to the wall 152.

Figure 9:
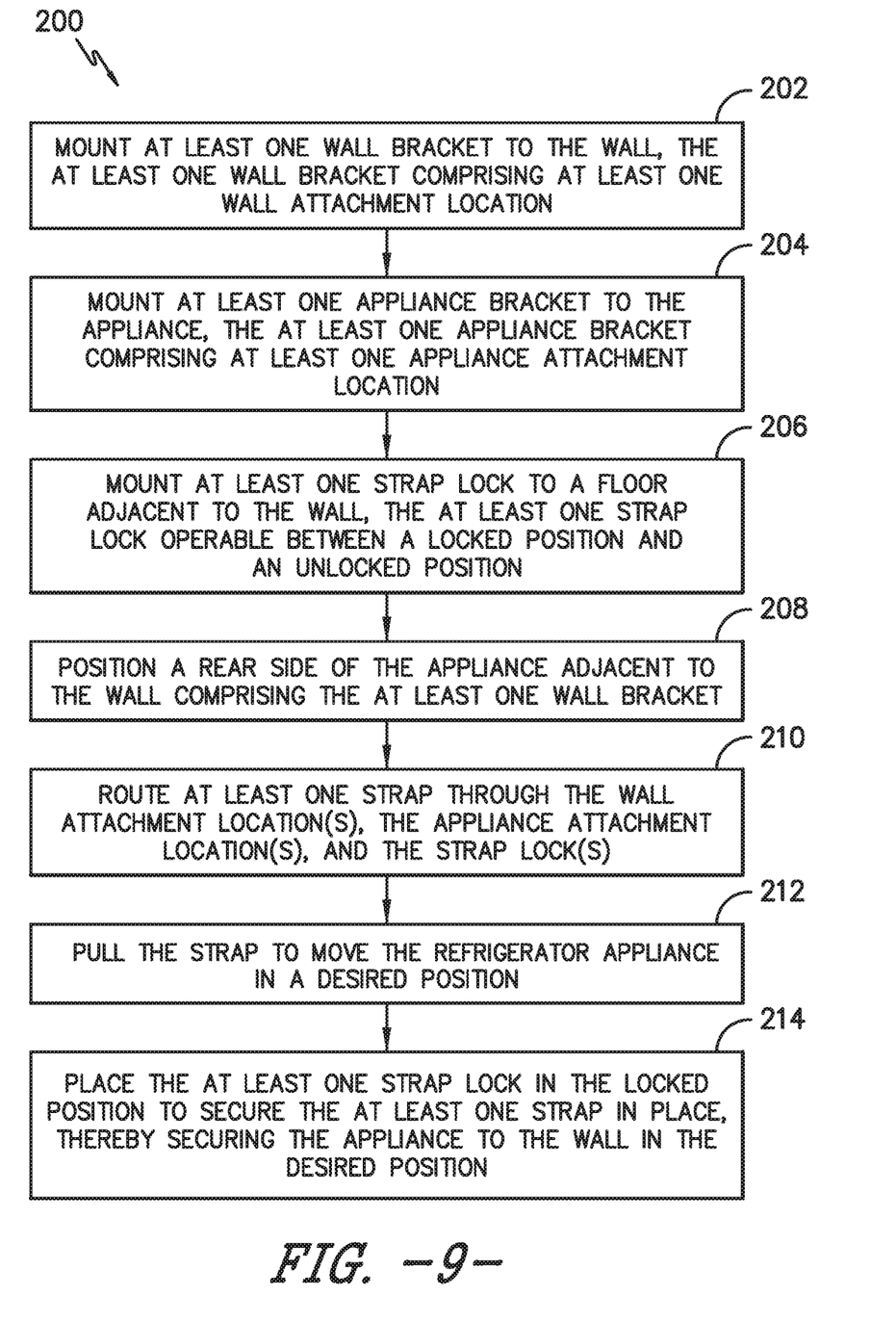
FIG. 9 illustrates a flow diagram of one embodiment of a method for mounting a refrigerator appliance according to an exemplary embodiment of the present subject matter.

Referring now to FIG. 9, a flow diagram of one embodiment of a method 200 for securing a refrigerator appliance to a wall, e.g. using the mounting system 150 described herein, according to the present disclosure is illustrated. It should be appreciated that the disclosed method 200 may be implemented with any suitable appliance having any suitable configuration, in addition to a refrigerator appliance. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes mounting at least one wall bracket having at least one wall attachment location to the wall. For example, the wall bracket(s) may be mounted to the wall 152 via one or more fasteners. As shown at (204), the method 200 mounting at least one appliance bracket having at least one appliance attachment location to the refrigerator appliance. For example, the appliance bracket(s) may be mounted to the appliance 100 via an adhesive, one or more fasteners, or by being foamed in place.

As shown at (206), the method 200 includes mounting at least one strap lock to a floor adjacent to the wall. As mentioned, the strap lock is operable between a locked position and an unlocked position. As shown at (208), the method 200 includes positioning a rear side of the refrigerator appliance 100 adjacent to the wall 152 containing the wall bracket(s). As shown at (210), the method 200 includes routing at least one strap through the wall attachment location(s), the appliance attachment location(s), and the strap lock(s). As shown at (212), the method 200 includes pulling the strap to move the refrigerator appliance in a desired position. Once positioned, as shown at (214), the method 200 placing the at least one strap lock in the locked position to secure the at least one strap in place, thereby securing the refrigerator appliance to the wall in the desired position. In certain embodiments, the method may also include maintaining tension of the strap(s) while placing the strap lock in the locked position to secure the strap(s) in place.

Figure 10:
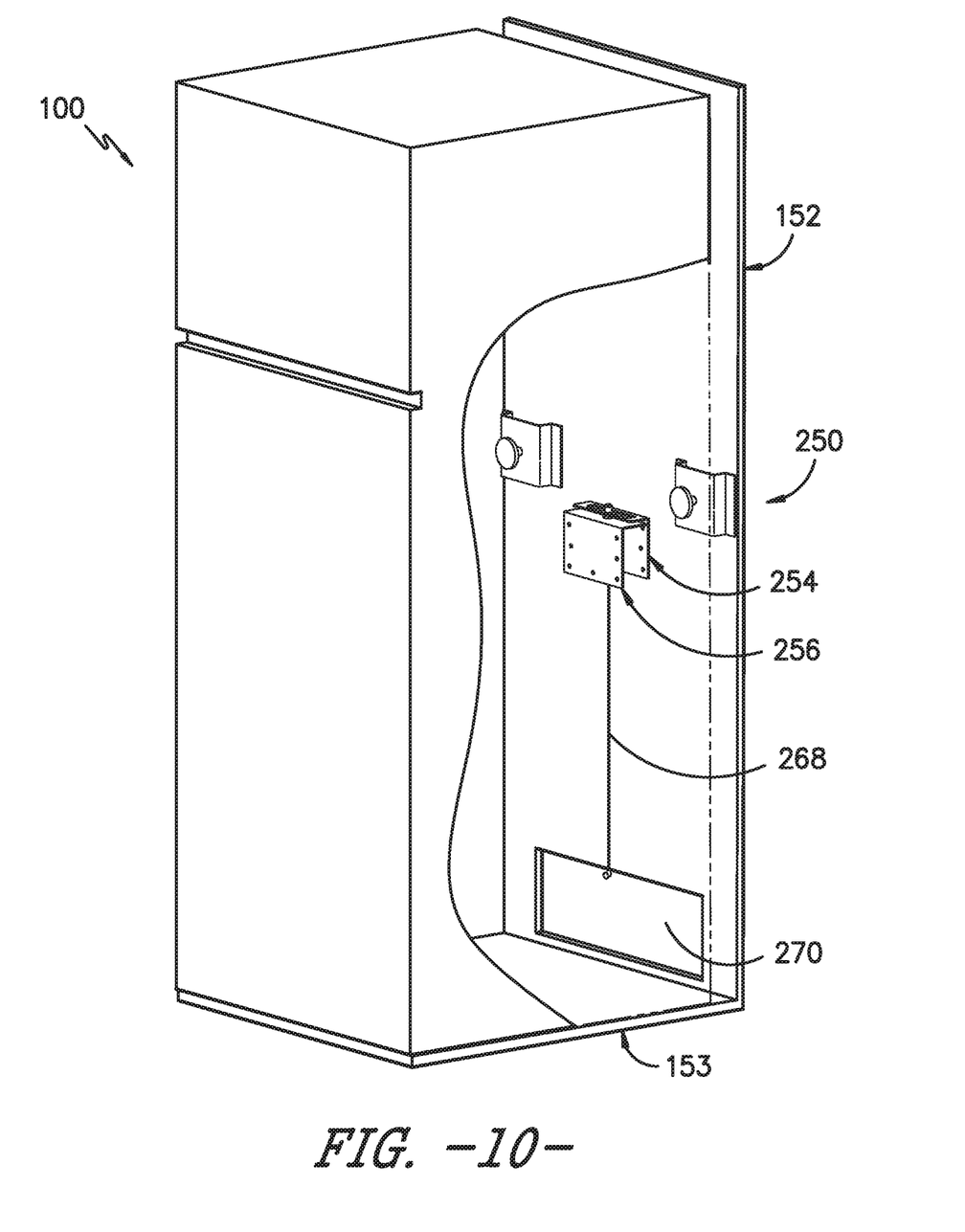
FIG. 10 illustrates a front elevation view of a refrigerator appliance, particularly illustrating another embodiment of a mounting system securing the refrigerator in place according to an exemplary embodiment of the present subject matter.
Figure 11:
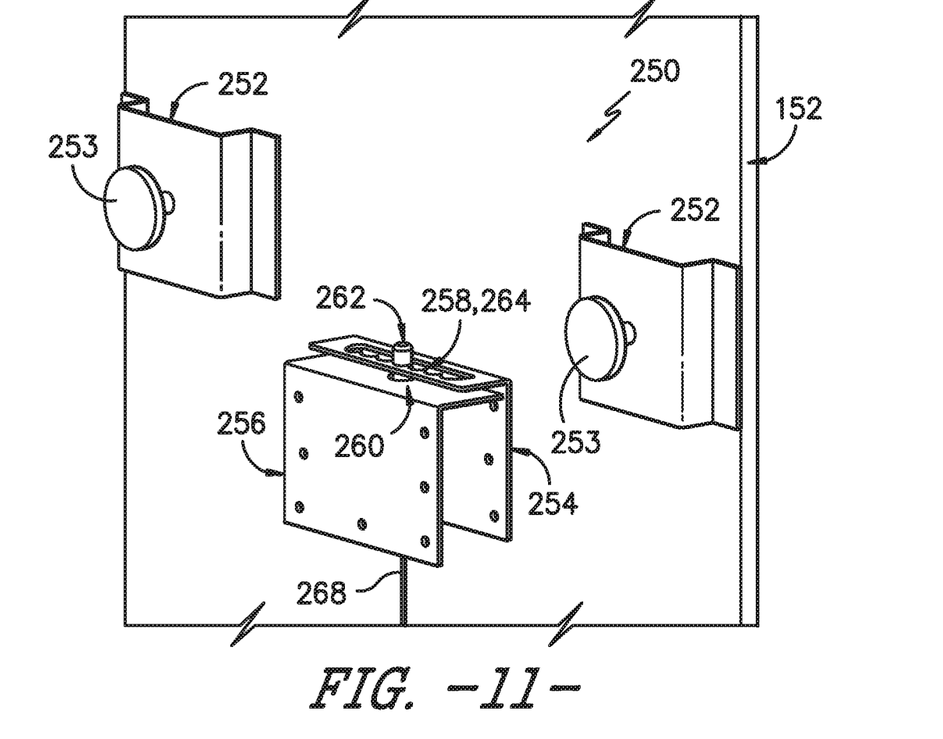
FIG. 11 illustrates a detailed, perspective view of the mounting system of FIG. 10.
Figure 12:
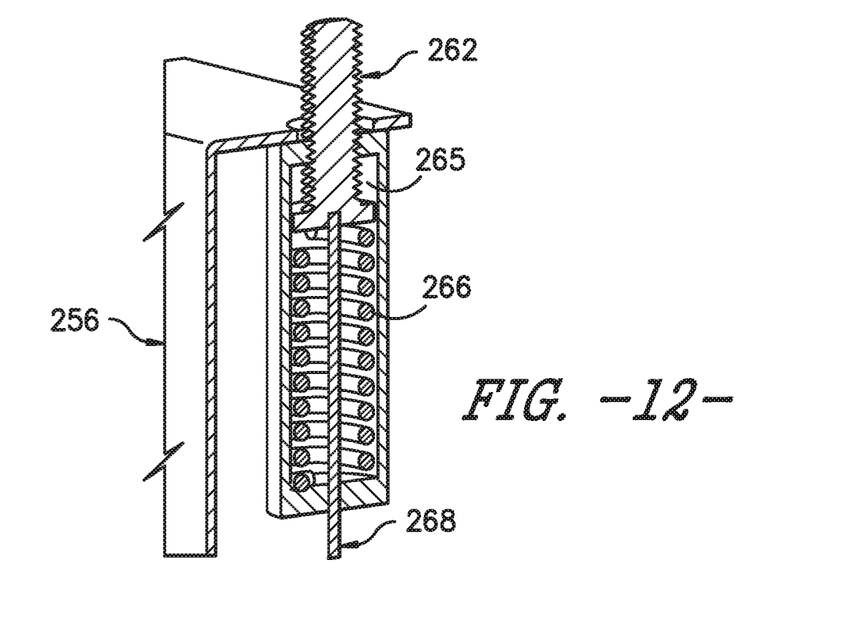
FIG. 12 illustrates a detailed, partial perspective view of certain components of the mounting system of FIG. 11.

Referring now to FIGS. 10-12, various views of another embodiment of a mounting system 250 for securing the refrigerator appliance 100 to the wall 152 is illustrated. As shown, the mounting system 250 includes at least one wall bracket 254 for mounting to the wall 152 and at least one appliance bracket 256 for mounting to the refrigerator appliance 100. As shown particularly in FIG. 11, the wall bracket(s) 254 includes at least one wall attachment location 258 and the appliance bracket(s) 256 includes at least one appliance attachment location 260. Such brackets 254, 256 may have any suitable configuration. For example, as shown, the brackets 254, 256 may be L-shaped brackets.

Furthermore, as shown in FIGS. 11 and 12, the mounting system 250 further includes a male component 262 extending from one of the wall bracket 254 or the appliance bracket 256 and a female component 264 extending from the other of the wall bracket 254 or the appliance bracket 256. For example, as shown in the illustrated embodiment, the male component 262 extends from the appliance bracket 256, whereas the female member 264 is formed into the wall bracket 254. Moreover, as shown, the male component 262 is moveable in a vertical direction. Thus, when the refrigerator appliance 100 is positioned adjacent to the wall 152, the male component 262 engages the female component 264 to lock the refrigerator appliance 100 in place (i.e. against the wall 152).

In particular embodiments, as shown in FIG. 11, the female component 264 may be a slot or opening formed into a flange of the wall bracket 254. In addition, as shown in FIG. 11, the male component 262 may be a fastener that fits within the slot. Moreover, as shown in the embodiment of FIG. 12, the male component 262 may extend from a recess 265 in the appliance bracket 256. In such embodiments, as shown, the recess 265 may also include spring 266 positioned below the male component 262 such that the male component 262 is biased upward in the vertical direction via the spring 266 within the recess 265.

Thus, in certain embodiments, as shown in FIGS. 10-12, the mounting system 250 may also include at least one release strap 268 secured to the bottom end of the male component 262. Accordingly, in such embodiments, upon pulling on the release strap 268, the male component 262 is pulled downward in the vertical direction so as to compress the spring 265 within the recess 265. Thus, when the male component 262 is recessed within recess 265, the male component 262 disengages with the female component 264 to release the refrigerator appliance 100 from being locked against the wall 152. In particular embodiments, as shown in FIG. 10, as an example, the release strap 268 may be accessed from an exterior door 270, i.e. that may be located on the outside of the recreational vehicle. The release strap 268 can also be used when the refrigerator appliance 100 is initially installed against the wall 152. For example, in such embodiments, a user can pull the release strap 268 to lower the male component 262 within the recess 265 and at the same time, the refrigerator appliance 100 can be positioned against the wall 152 until the brackets 254, 256 are aligned. The release strap 268 can then be release such that the male component 262 is raised to engage the female component 264, thereby locking the refrigerator appliance 100 in place.

Referring particularly to FIG. 11, the mounting system 250 may also include at least one spacer 252 for providing a predetermined gap between the refrigerator appliance 100 and the wall 152. For example, as shown, the mounting system 250 may include two spacers 252, with one on each side of the wall 152 and the brackets 254, 256. Furthermore, as shown, the spacers 252 described herein may also include an adjustable pad 253 for reducing slippage, shock, or vibration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A mounting system for securing an appliance to a wall, the mounting system comprising:
    at least one wall bracket for mounting to the wall, the at least one wall bracket comprising at least one wall attachment location;
    at least one appliance bracket for mounting to the appliance, the at least one appliance bracket comprising at least one appliance attachment location;
    at least one floor bracket for mounting to at least one of a floor or the wall, the at least one floor bracket comprising at least one floor attachment location;
    at least one strap lock for mounting to a floor adjacent to the wall, the at least one strap lock operable between a locked position and an unlocked position; and
    at least one strap routed through the at least one wall attachment location, the at least one appliance attachment location, and the at least one strap lock,
    wherein, when in the locked position, the at least one strap lock secures the at least one strap in place, thereby securing the appliance to the wall.

2. The mounting system of claim 1, wherein the at least one strap is routed through at least one floor attachment location.

3. The mounting system of claim 1, wherein the at least one wall bracket comprises at least one spacer for providing a predetermined gap between the appliance and the wall.

4. The mounting system of claim 3, wherein the at least one spacer further comprises an elastomeric pad for reducing slippage, shock, or vibration.

5. The mounting system of claim 4, wherein the elastomeric pad further comprises at least one fastener for adjusting a distance between a face of the elastomeric pad and the wall.

6. The mounting system of claim 3, wherein the at least one spacer comprises a first spacer and a second spacer, the first and second spacers being positioned on opposing sides of the at least one wall attachment location.

7. The mounting system of claim 1, wherein the at least one wall bracket comprises a first wall bracket and a second wall bracket, the first wall bracket for mounting at a first height, the second wall bracket for mounting a second height, the first height being greater than the second height.

8. The mounting system of claim 7, wherein the at least one appliance bracket comprises a first appliance bracket and a second appliance bracket, wherein a distance between the first appliance bracket and the second appliance bracket is less than a distance between the first wall bracket and the second wall bracket.

9. The mounting system of claim 1, wherein, when the appliance is secured to the wall via the mounting system, only the at least one strap lock is visible, with the at least one wall bracket, the at least one appliance bracket, and the at least one floor bracket being concealed by the appliance.

10. The mounting system of claim 1, wherein the at least one strap lock comprises a floating wedge mounted to a bracket and at least one fastener, wherein the at least one fastener biases the floating wedge against an inclined plane on a body of the bracket and the at least one strap being routed below the floating wedge such that, when the at least one fastener is advanced to move the floating wedge against the inclined plane, the floating edge is forced downward onto the at least one strap and into the locked position.

11. The mounting system of claim 1, wherein the wall is within at least one of a ground transportation vehicle, watercraft, or aircraft.

12. A method for securing an appliance to a wall, the method comprising:
    mounting at least one wall bracket to the wall, the at least one wall bracket comprising at least one wall attachment location;
    mounting at least one appliance bracket to the appliance, the at least one appliance bracket comprising at least one appliance attachment location;
    mounting at least one floor bracket to at least one of a floor or the wall, the at least one floor bracket comprising at least one floor attachment location;
    mounting at least one strap lock to a floor adjacent to the wall, the at least one strap lock operable between a locked position and an unlocked position;
    positioning a rear side of the appliance adjacent to the wall comprising the at least one wall bracket;
    routing at least one strap through the at least one wall attachment location, the at least one appliance attachment location, the at least one floor bracket, and the at least one strap lock;
    pulling the at least one strap to move the appliance in a desired position; and
    placing the at least one strap lock in the locked position to secure the at least one strap in place, thereby securing the appliance to the wall in the desired position.

13. The method of claim 12, wherein mounting at least one wall bracket to the wall further comprises mounting the at least one wall bracket to the wall via one or more fasteners.

14. The method of claim 12, wherein mounting at least one appliance bracket to the appliance further comprises mounting at least one appliance bracket to the appliance via at least one of an adhesive, one or more fasteners, or by being foamed in place.

15. The method of claim 12, further comprising maintaining tension of the at least one strap while placing the at least one strap lock in the locked position to secure the at least one strap in place.

16. A mounting system for securing an appliance to a wall, the mounting system comprising:
- at least one wall bracket for mounting to the wall, the at least one wall bracket comprising at least one wall attachment location;
- at least one appliance bracket for mounting to the appliance, the at least one appliance bracket comprising at least one appliance attachment location;
- a male component extending from one of the at least one wall bracket or the at least one appliance bracket, the male component being moveable in a vertical direction;
- a female component extending from the other of the at least one wall bracket or the at least one appliance bracket;
- at least one spacer for providing a predetermined gap between the appliance and the wall, the at least one spacer further comprises an adjustable pad for reducing slippage, shock, or vibration, wherein, when the appliance is positioned adjacent to the wall comprising the at least one wall bracket, the male component engages the female component to lock the appliance in place.

17. The mounting system of claim 16, wherein the male component is received within a recess of the at least one wall bracket or the at least one appliance bracket and is biased upward in the vertical direction via a spring within the recess, the mounting system further comprising at least one release strap secured to the male component, wherein, upon pulling on the at least one release strap, the male component is pulled downward in the vertical direction and is received within the recess so as to disengage with the female component to release the appliance from being locked against the wall.

18. The mounting system of claim 16, wherein the at least one wall bracket and the at least one appliance bracket comprise L-shaped brackets, and wherein the female component comprises a slot in a corresponding L-shaped bracket.

* * * * *